United States Patent
Hafuka et al.

(10) Patent No.: US 8,032,576 B2
(45) Date of Patent: Oct. 4, 2011

(54) FAST FOURIER TRANSFORM CIRCUIT AND FAST FOURIER TRANSFORM METHOD

(75) Inventors: Takamitsu Hafuka, Tokyo (JP); Masato Tanaka, Tokyo (JP); Hiroji Akahori, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 1043 days.

(21) Appl. No.: 11/859,863

(22) Filed: Sep. 24, 2007

(65) Prior Publication Data
US 2008/0215656 A1 Sep. 4, 2008

(30) Foreign Application Priority Data
Sep. 26, 2006 (JP) ................. 2006-261323

(51) Int. Cl.
*G06F 17/14* (2006.01)
(52) U.S. Cl. ....................................... 708/404
(58) Field of Classification Search .................. None
See application file for complete search history.

(56) References Cited

U.S. PATENT DOCUMENTS

| 3,816,729 | A * | 6/1974 | Works .......................... 708/404 |
| 7,088,791 | B2 * | 8/2006 | Magee ......................... 375/340 |
| 7,496,618 | B2 * | 2/2009 | Brown et al. ................. 708/404 |
| 2002/0156822 | A1 * | 10/2002 | Tanai ............................ 708/404 |

FOREIGN PATENT DOCUMENTS
JP 05-266059 10/1993
JP 2002288151 A1 10/2002

* cited by examiner

*Primary Examiner* — David H Malzahn
(74) *Attorney, Agent, or Firm* — Volentine & Whitt, PLLC

(57) ABSTRACT

A fast Fourier transform circuit includes a computation component, an extraction component and a setting component. The extraction component, at each step of the computation, extracts, from computation result data points calculated by the computation component, data in a pre-specified range with a number of bits the same as a predetermined number of bits, which is an effective range for a butterfly computations. The setting component sets the data points of the predetermined number of bits which have been extracted by the extraction component to serve as input data when butterfly computations of a next step are to be performed by the computation component.

11 Claims, 16 Drawing Sheets

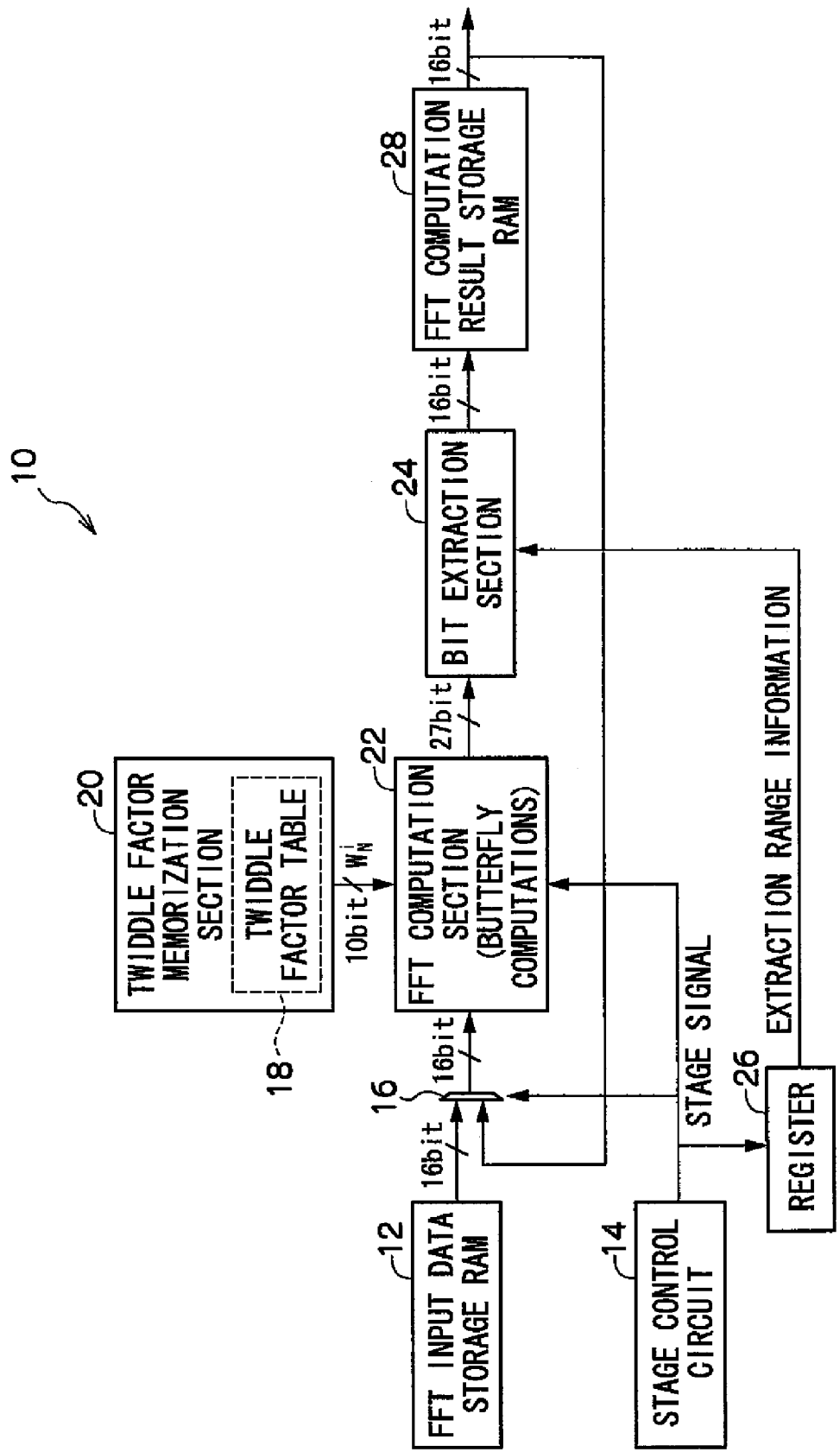

← 512 POINTS →

BASE 10: 1500000
BASE 2: 000000101101110001101100000 (27 BITS)

6 BIT MARGIN
21ST BIT

FIG. 8E

EXTRACTION RANGE TABLE

| NUMBER OF BITS IN MARGIN OF MOST SIGNIFICANT BIT | BIT EXTRACTION RANGE |
|---|---|
| 1 | 27~12 |
| 2 | 26~11 |
| 3 | 25~10 |
| 4 | 24~9 |
| 5 | 23~8 |
| 6 | 22~7 |
| 7 | 21~6 |
| 8 | 20~5 |
| 9 | 19~4 |
| 10 | 18~3 |
| 11 | 17~2 |
| 12 | 16~1 |

OUTPUT EXTRACTION RANGE SIGNAL INDICATING EXTRACTION RANGE

⊕ : ADDITION  ▶ : MULTIPLICATION

FAST FOURIER TRANSFORM CIRCUIT AND FAST FOURIER TRANSFORM METHOD

CROSS-REFERENCE TO RELATED APPLICATION

This application claims priority under 35 USC 119 from Japanese Patent Application No. 2006-261323, the disclosure of which is incorporated by reference herein.

BACKGROUND OF THE INVENTION

1. Field of the Invention

The present invention relates to a fast Fourier transform circuit and a fast Fourier transform method, and particularly relates to a fast Fourier transform circuit and fast Fourier transform method for applying a discrete-time Fourier transform computation to $2^n$ points of input data, each of a predetermined number of bits (n being a natural number greater than 0), by dividing into a plurality of stages and performing butterfly computations.

2. Description of the Related Art

With the advance of digital technology in recent years, broadcasts such as terrestrial television broadcasts and the like are shifting from analog broadcasting to digital broadcasting. For such digital broadcasts, an orthogonal frequency division multiplexing system below referred to as OFDM is employed as a modulation system. For demodulation of a carrier wave in OFDM, fast Fourier transforms (below referred to as FFT) are utilized.

These fast Fourier transforms are a technology for reducing the computation volume of a discrete-time Fourier transform below referred to as a DFT). A great many computation technologies have been proposed for these fast Fourier transforms. One generally well-known computation technology is a Cooley-Tukey-based computation technology which performs a discrete-time Fourier transform by performing butterfly computations on input data, divided into a plurality of stages (steps). As a related technology, Japanese patent Application Laid-Open (JP-A) No. 5-266059 has disclosed a technique which improves a processing efficiency of these butterfly computations.

Herebelow, a frequency-thirning Cooley-Tukey-type fast Fourier transform with a radix of 2 will be described. Below, a number of data points N of a discrete-time Fourier transform (a number of data samples) is 4.

A definition equation of a discrete-time Fourier transform is shown by the following equation (1). $W_N$ in equation (1) is a twiddle factor.

$$X(k) = \sum_{n=0}^{N-1} x(n) \cdot W_N^{nk} \quad (1)$$

Here, $W_N = e^{-j2\pi/N}$

Hence, a discrete-time Fourier transform with the number of data points being 4 is expressed by the following parallel matrix equation of equation (2).

$$\begin{bmatrix} X(0) \\ X(1) \\ X(2) \\ X(3) \end{bmatrix} = \begin{bmatrix} W_4^0 W_4^0 W_4^0 W_4^0 \\ W_4^0 W_4^1 W_4^2 W_4^3 \\ W_4^0 W_4^2 W_4^4 W_4^6 \\ W_4^0 W_4^3 W_4^6 W_4^9 \end{bmatrix} \cdot \begin{bmatrix} x(0) \\ x(1) \\ x(2) \\ x(3) \end{bmatrix} \quad (2)$$

In a Cooley-Tukey-type computation technique, each X(k) (k=1, 2, 3, 4) in the above equation (2) is substituted as in the following equation (3).

$$\begin{bmatrix} X(0) \\ X(2) \\ X(1) \\ X(3) \end{bmatrix} = \begin{bmatrix} W_4^0 W_4^0 W_4^0 W_4^0 \\ W_4^0 W_4^2 W_4^4 W_4^6 \\ W_4^0 W_4^1 W_4^2 W_4^3 \\ W_4^0 W_4^3 W_4^6 W_4^9 \end{bmatrix} \cdot \begin{bmatrix} x(0) \\ x(1) \\ x(2) \\ x(3) \end{bmatrix} \quad (3)$$

The 4×4 matrix in equation (3) can be expressed as shown in the following equation (4).

$$\hat{W}_4 = \begin{bmatrix} W_4^0 W_4^0 W_4^0 W_4^0 \\ W_4^0 W_4^2 W_4^4 W_4^6 \\ W_4^0 W_4^1 W_4^2 W_4^3 \\ W_4^0 W_4^3 W_4^6 W_4^9 \end{bmatrix} \quad (4)$$

Now, as is shown in FIG. 9, the twiddle factor $W_N$ can be expressed as points on a unit circle in a complex plane. Therefore, the relationships shown in the following equations (5) and (6) apply to the twiddle factor.

$$W_N^{2k} = W_{N/2}^k \quad (5)$$

$$W_N^{nk} = W_N^{((nk))N} \quad (6)$$

Therefore, equation (3) can be rewritten as equation (7).

$$\begin{bmatrix} X(0) \\ X(2) \\ X(1) \\ X(3) \end{bmatrix} = \begin{bmatrix} W_4^0 W_4^0 W_4^0 W_4^0 \\ W_4^0 W_4^2 W_4^0 W_4^2 \\ W_4^0 W_4^1 W_4^2 W_4^3 \\ W_4^0 W_4^3 W_4^2 W_4^1 \end{bmatrix} \cdot \begin{bmatrix} x(0) \\ x(1) \\ x(2) \\ x(3) \end{bmatrix} \quad (7)$$

$$= \begin{bmatrix} \hat{W}_2 & \hat{W}_2 \\ \hat{W}_2 \Lambda_2 & -\hat{W}_2 \Lambda_2 \end{bmatrix} \cdot \begin{bmatrix} x(0) \\ x(1) \\ x(2) \\ x(3) \end{bmatrix}$$

$$\hat{W}_2 = \begin{bmatrix} W_2^0 W_2^0 \\ W_2^0 W_2^1 \end{bmatrix}$$

$$\Lambda_2 = \begin{bmatrix} W_4^0 & 0 \\ 0 & W_4^1 \end{bmatrix}$$

Hence, if equation (3) is expressed using a 2×2 zero matrix $O_2$ and a 2×2 unit matrix $I_2$, the following equation (8) is produced.

$$\begin{bmatrix} X(0) \\ X(2) \\ X(1) \\ X(3) \end{bmatrix} = \begin{bmatrix} \hat{W}_2 & o_2 \\ o_2 & \hat{W}_2 \end{bmatrix} \cdot \begin{bmatrix} I_2 & o_2 \\ o_2 & I_2 \end{bmatrix} \cdot \begin{bmatrix} I_2 & I_2 \\ I_2 & -I_2 \end{bmatrix} \cdot \begin{bmatrix} x(0) \\ x(1) \\ x(2) \\ x(3) \end{bmatrix} \quad (8)$$

$$= \begin{bmatrix} 1 & 1 & 0 & 0 \\ 1 & -1 & 0 & 0 \\ 0 & 0 & 1 & 1 \\ 0 & 0 & 1 & -1 \end{bmatrix} \cdot \begin{bmatrix} 1 & 0 & 0 & 0 \\ 0 & 1 & 0 & 0 \\ 0 & 0 & W_4^0 & 0 \\ 0 & 0 & 0 & W_4^0 \end{bmatrix} \cdot$$

$$\begin{bmatrix} 1 & 0 & 1 & 0 \\ 0 & 1 & 0 & 1 \\ 1 & 0 & 1 & 0 \\ 0 & 1 & 0 & -1 \end{bmatrix} \begin{bmatrix} x(0) \\ x(1) \\ x(2) \\ x(3) \end{bmatrix}$$

That is, a discrete-time Fourier transform with the number of data points N being 4 can be decomposed to be a product or matrices constituted of discrete-time Fourier transforms with numbers of data points N being 2. Such decomposition is not limited to cases in which the number of data points N is 4 but generally applies to cases in which the number of data points N is $2^n$ (where n is a natural number greater than 0).

The decomposition shown in the above equation (8) can be represented as shown in FIG. 10, being represented by a combination of the butterfly computation shown in FIG. 11.

Similarly, taking a discrete-time Fourier transform with the number of data points N being 8 as an example, the discrete-time Fourier transform with the number of data points N of 8 can be decomposed into discrete-time Fourier transforms with numbers of data points N of 4 by sorting the X(k), and the discrete-time Fourier transforms with numbers of data points N of 4 can be further decomposed into discrete-time Fourier transforms with numbers of data points N of 2. This decomposition can be represented as in FIG. 12.

As shown in FIG. 10 (a data point count N=4 fast Fourier transform) and FIG. 12 (a data point count N=8 fast Fourier transform), a fast Fourier transform can be implemented by a combination of butterfly computations, and a number of stages of these butterfly computations can be expressed as $\log_2 N$. For example, in the case of a data point count N=8 fast Fourier transform, the number of stages is $\log_2 8=3$.

FIG. 13 shows an example of a fixed-point fast Fourier transform circuit 10' which implements a Cooley-Tukey-type fast Fourier transform.

Operations of this fast Fourier transform circuit 10', with the radix being 2, will be briefly described for a case of performing a fast Fourier transform with the number of data points N being 8.

(1) Input data to be inputted to the fast Fourier transform circuit 10' is memorized at an FFT input data storage RAM 12'. A stage control circuit 14' outputs a stage signal (a signal indicating which stage is in operation) and controls operations of a selector 16' and an FFT computation section 22'. Initially, the stage control circuit 14' outputs a stage signal indicating a first stage.

(2) When the stage signal outputted by the stage control circuit 14' indicates the first stage, data from the FFT input data storage RAM 12' is selected by the selector 16', and the data from the FFT input data storage RAM 12' is inputted to the FFT computation section 22'.

(3) The FFT computation section 22' reads respective twiddle factors corresponding to the stage indicated by the stage signal from a twiddle factor table 18', which is memorized at a twiddle factor memorization section 20', and performs butterfly computations on the data that have been inputted using the respective twiddle factors that have been read.

(4) Results of the butterfly computations are memorized in an FFT computation result storage RAM 28'. When the butterfly computation results have all been memorized to the FFT computation result storage RAM 28', the stage control circuit 14' outputs a stage signal indicating the next stage.

(5) When the stage signal outputted by the stage control circuit 14' indicates the second or a subsequent stage, data from the FFT computation result storage RAM 28' is selected by the selector 16', and the data from the FFT computation result storage RAM 28' is inputted to the FFT computation section 22'.

(6) Thereafter, the operations of (3) to (5) above are repeated, for a number of stages corresponding to the data point count N.

(7) After the butterfly computations for the number of stages have been completed (i.e., if the data point count N is 8, after three stages have been completed), the data that has been memorized to the FFT computation result storage RAM 28' serves as output data of the fast Fourier transform.

Now, in a case in which the above-described Cooley-Tukey-type fast Fourier transform computation is practically implemented in hardware, data of unlimited bit widths cannot be held in the FFT input data storage RAM 12', the FFT computation result storage RAM 28', the FFT computation section 22' and the like (FIG. 13). Therefore, a bit width limitation is inherent in the circuit.

For example, bit widths for one data point in the FFT input data storage RAM 12' and the FFT computation result storage RAM 28' may be limited to 16 bits, and a bit width of each twiddle factor $W_N^i$ may be 10 bits. In such a case, as shown in FIG. 14, one cycle of addition of 16 bits and one multiplication of an addition result with the twiddle factor are performed. Therefore, data widths of output data points which are outputted as results of the butterfly computations by the FFT computation section 22' are up to 27 bits.

However, the bit width of the FFT computation result storage RAM 28' is limited to 16 bits. Therefore, in this conventional fast Fourier transform circuit 10', as shown in FIG. 15, it is necessary to provide a bit extraction section 24', to extract 16 bits of data from the 27 bits with the bit extraction section 24', and store the 16 bits of data in the FFT computation result storage RAM 28'.

At this bit extraction section 24', which 16 bits of data to extract from the 27 bits is specified beforehand. For example, extraction may always be fixedly applied, to always extract the most significant 16 bits of data of a 27-bit signal, or the like.

However, if the range of data to be extracted by the bit extraction section 24' is fixed thus, the data extraction range may not be an appropriate range, depending on characteristics of input data that are inputted to the fast Fourier transform circuit 10' (the size of an amplitude value, whether randomness is high or low, whether the data is an impulse with a localized peak, and so forth). Hence, if the data extraction range is not a suitable range, overflows/underflows, errors and the like may occur during computation of a fast Fourier transform, and a final computation error of the fast Fourier transform may be large, which is a problem.

SUMMARY OF THE INVENTION

The present invention has been devised in order to solve the problem described above, and an object of the present invention is to provide a fast Fourier transform circuit and fast Fourier transform method capable of reducing computation errors.

In order to achieve the object described above, an aspect of the present invention includes: a computation component that performs a discrete-time Fourier transform computation by dividing computations between a plurality of steps, the computations performing butterfly computations on $2^n$ points of input data each of a predetermined number of bits, n being a natural number greater than 0, and calculating $2^n$ computation result data points with numbers of bits larger than the predetermined number of bits; an extraction component that, at each step, extracts, from the computation result data points calculated by the computation component, data in a pre-specified range with a number of bits the same as the predetermined number of bits, which is an effective range for the butterfly computations; and a setting component that sets the data points of the predetermined number of bits which have been extracted by the extraction component to serve as input data when butterfly computations of a next step are to be performed by the computation component.

BRIEF DESCRIPTION OF THE DRAWINGS

FIG. 1 is a schematic diagram showing structure of a fast Fourier transform circuit relating to a first embodiment of the present invention.

FIG. 8A to FIG. 8E are diagrams showing a flow when a data extraction range is being specified.

DETAILED DESCRIPTION OF THE INVENTION

Figure 2A:
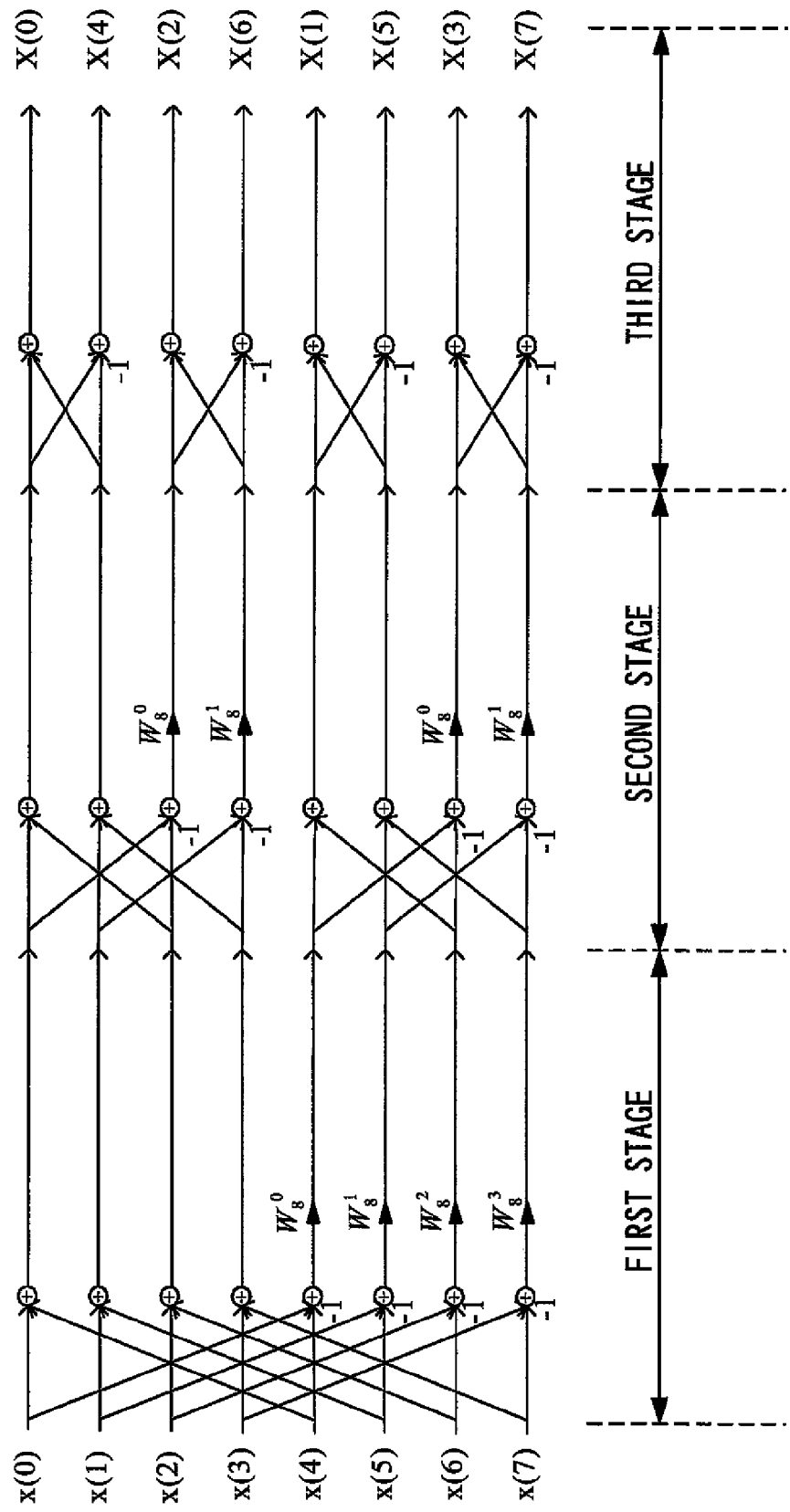
FIG. 2A is a diagram showing a flow of computation of a fast Fourier transform with a number of data points being 8.

Herebelow, embodiments of the present invention will be described in detail with reference to the drawings.

First Embodiment

FIG. 1 shows structure of a fast Fourier transform circuit 10 relating to the present embodiment.

As shown in FIG. 1, the fast Fourier transform circuit 10 is provided with an FFT input data storage RAM 12, a stage control circuit 14, a selector 16 and a twiddle factor memorization section 20. The FFT input data storage RAM 12 memorizes input data which is inputted to be a subject to which a fast Fourier transform is applied. The stage control circuit 14 outputs stage signals indicating each stage while the fast Fourier transform is being performed on the data that has been inputted. The selector 16 selectively outputs data that has been memorized at the FFT input data storage RAM 12 or an FFT computation result storage RAM 28, in accordance with the stage indicated by a stage signal inputted from the stage control circuit 14. A twiddle factor table 18, which memorizes respective twiddle factors to be used in butterfly computations at each stage, is memorized in advance at the twiddle factor memorization section 20.

The fast Fourier transform circuit 10 is further provided with an FFT computation section 22, a bit extraction section 24, a register 26 and the FFT computation result storage RAM 28. The FFT computation section 22 reads twiddle factors from the twiddle factor table 18 memorized at the twiddle factor memorization section 20 in accordance with the stage indicated by the stage signal inputted by the stage control circuit 14, and performs butterfly computations on data inputted by the selector 16 in accordance with the stage, using the respective twiddle factors that have been read. The bit extraction section 24 extracts, from computation result data points calculated by the FFT computation section 22, data in a range memorized beforehand, for each stage, at the register 26, which will be described later. The register 26 pre-memorizes information indicating the range to be extracted by the bit extraction section 24 at each stage. The FFT computation result storage RAM 28 memorizes the data extracted by the bit extraction section 24 as data to be set as input data when butterfly computations of the next stage are to be performed by the FFT computation section 22.

At the fast Fourier transform circuit 10, input data of 8 points of 16 bits each is memorized in the FFT input data storage RAM 12 as a subject to which a fast Fourier transform is to be applied.

The FFT computation section 22 performs butterfly computations on the input data in accordance with each stage and computes computation result data points with numbers of bits greater than the number of bits of the input data points. The FFT computation section 22 relating to the present embodiment applies butterfly computations to input data of 8 points of 16 bits each, in accordance with the stages, and computes computation result data of 8 points of 27 bits each.

Stage-differentiated range information, indicating ranges of 16 bits of respective data to be extracted from the computation result data of each of the 8 points, which are effective ranges for the butterfly computations, is memorized in the register 26 in advance for each stage. When a stage signal is inputted by the stage control circuit 14, the register 26 extracts information corresponding to the stage indicated by the stage signal from the stage-differentiated range information, and outputs this information to serve as extraction range information.

The bit extraction section 24 extracts data, in the range indicated by the extraction range information inputted by the register 26, from the computation result data points calculated by the FFT computation section 22.

Next, operation of the fast Fourier transform circuit 10 relating to the present embodiment will be described.

Figure 2B:
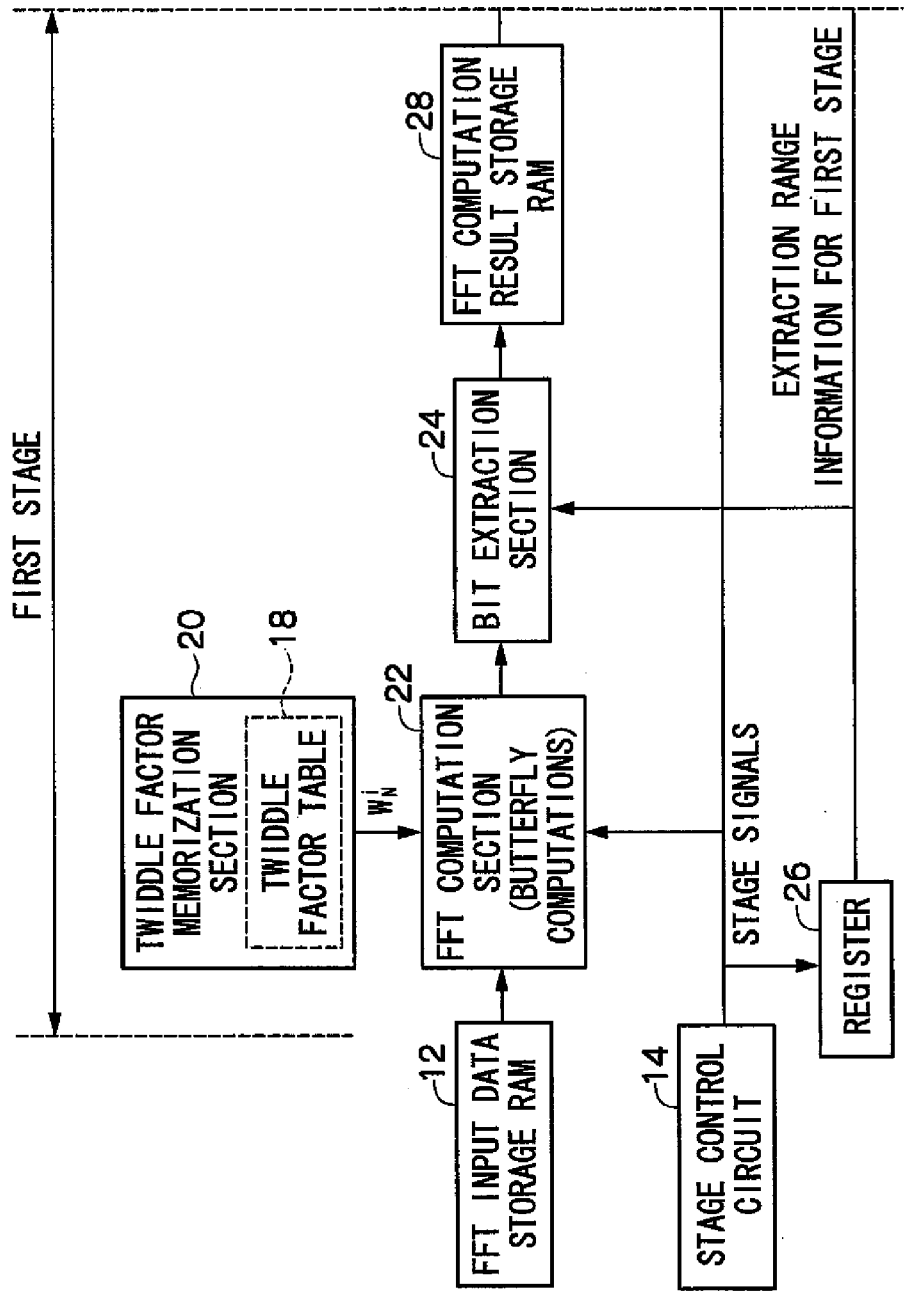
FIG. 2B to FIG. 2D are diagrams in which blocks of FIG. 1 are arrayed in a sequence of stages when a fast Fourier transform is being carried out.
Figure 2C:
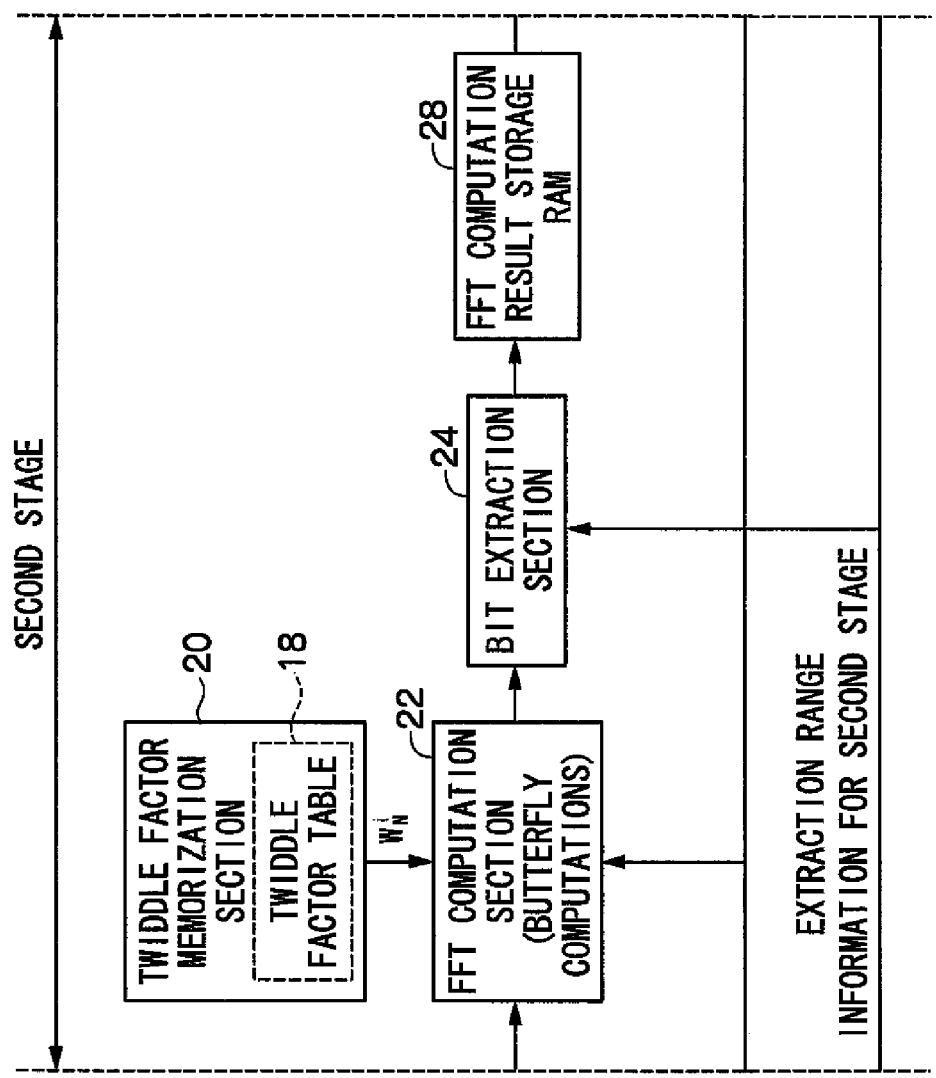
Figure 2D:
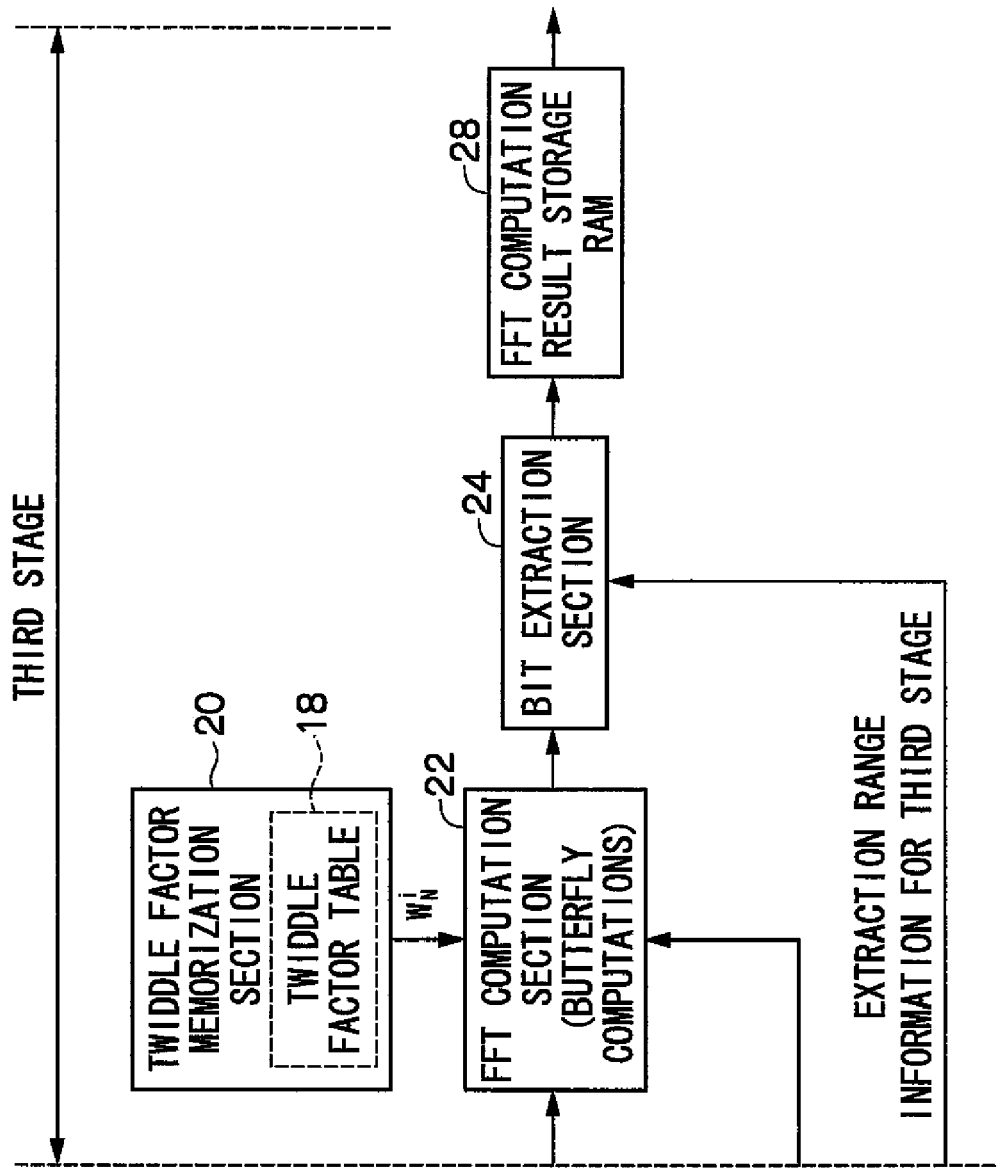

FIG. 2A shows a flow of computation in a case in which a fast Fourier transform with a number of data points N being 8 is decomposed in a Cooley-Tukey-type fast Fourier transform. FIG. 2B to FIG. 2D are diagrams in which blocks of FIG. 1 are arrayed in a sequence of stages of when a fast Fourier transform is being carried out (a processing sequence).

Because the fast Fourier transform circuit 10 relating to the present embodiment is for fast Fourier transforms with the number of data points being 8, as shown in FIG. 2A to FIG.

2D, a number of stages when performing butterfly computations is $\log_2 8=3$. In FIG. 2B to FIG. 2D, the blocks are arrayed in the order of the stages. Accordingly, the FFT computation section 22, the twiddle factor memorization section 20, the bit extraction section 24 and the FFT computation result storage RAM 28 are plurally included, each being respectively the same.

Figure 3:
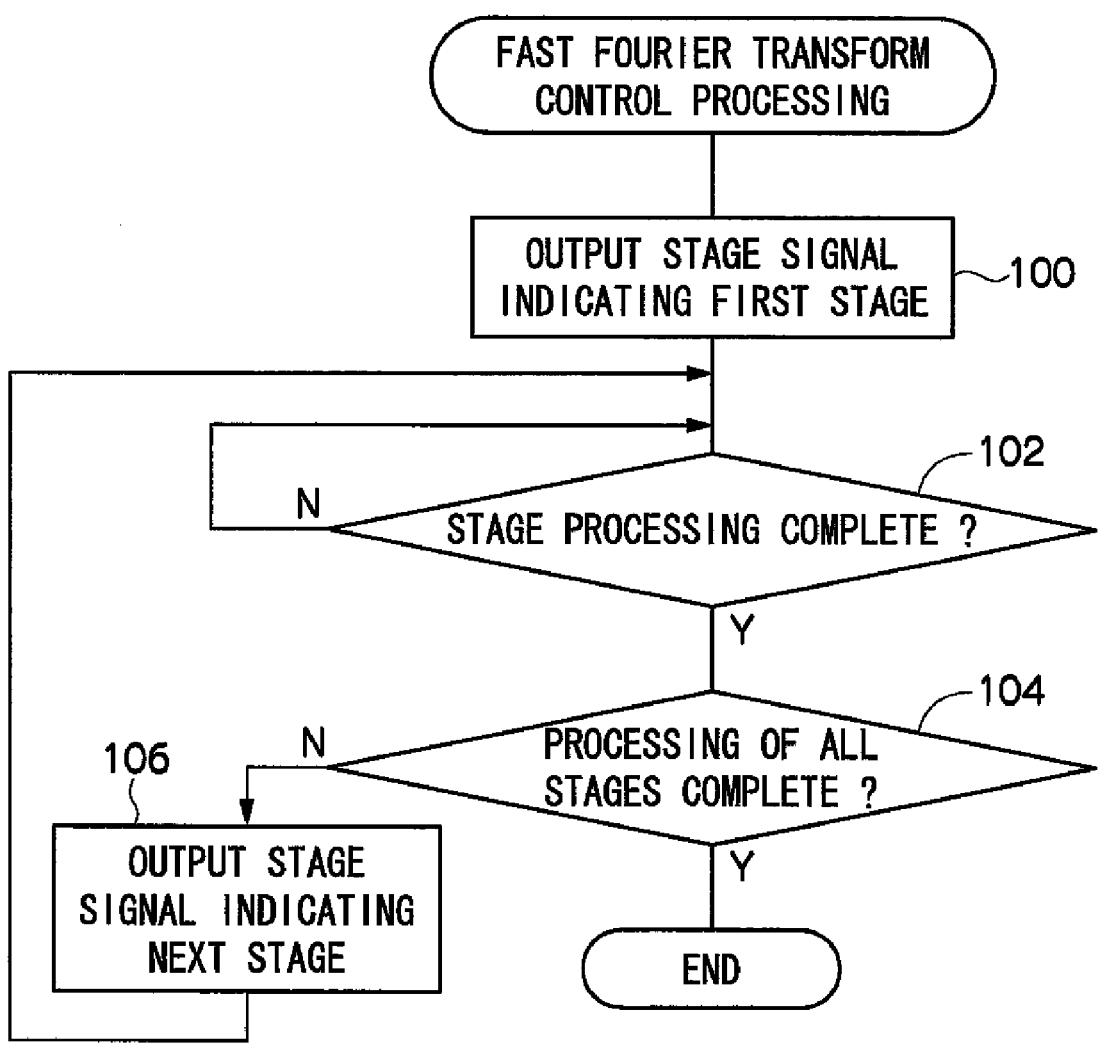
FIG. 3 is a flowchart showing a flow of fast Fourier transform control processing relating to the first embodiment of the present invention.

FIG. 3 shows a flowchart illustrating a flow of operations of fast Fourier transform control processing that is executed by the stage control circuit 14 when applying the fast Fourier transform to the input data.

In step 100 of FIG. 3, a stage signal indicating a first stage is outputted. Then, in step 102, the stage control circuit 14 waits for the end of processing for that stage.

When the inputted stage signal indicates the first stage, the selector 16 (see FIG. 1) selects data stored at the FFT input data storage RAM 12 and outputs this data to the FFT computation section 22. When the stage signal indicates a second or subsequent stage, the selector 16 selects data stored at the FFT computation result storage RAM 28 and outputs this data to the FFT computation section 22.

Meanwhile, the register 26 extracts information corresponding to the stage indicated by the inputted stage signal from the stage-differentiated range information that has been memorized, and outputs this information as the extraction range information. The FFT computation section 22 applies butterfly computations as shown in FIG. 2A, in accordance with the stage indicated by the inputted stage signal, to the input data inputted by the selector 16, and calculates computation result data.

The bit extraction section 24 extracts, from the computation result data points calculated by the FFT computation section 22, data in the range indicated by the extraction range information which has been inputted by the register 26.

The data extracted by the bit extraction section 24 is memorized at the FFT computation result storage RAM 28. When all data has been memorized to the FFT computation result storage RAM 28, processing of that stage ends.

Next, in step 104, it is judged whether or not processing of all stages has ended. If this judgment is negative, the processing goes on to step 106, and when this judgement is positive, the fast Fourier transform control processing ends.

In step 106, a stage signal indicating the next stage is outputted, and the processing goes to step 102 again.

After butterfly computations in accordance with the above-described fast Fourier transform control processing have been completed for the number of stages, the fast Fourier transform circuit 10 outputs data memorized in the FFT computation result storage RAM 28 as output data of the fast Fourier transform.

Figure 4A:
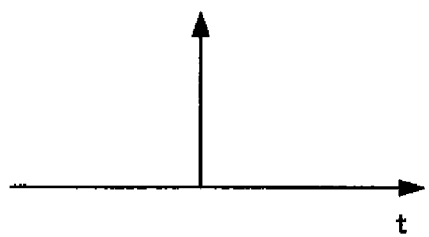
FIG. 4A is a graph showing an impulse-type signal.
Figure 4B:
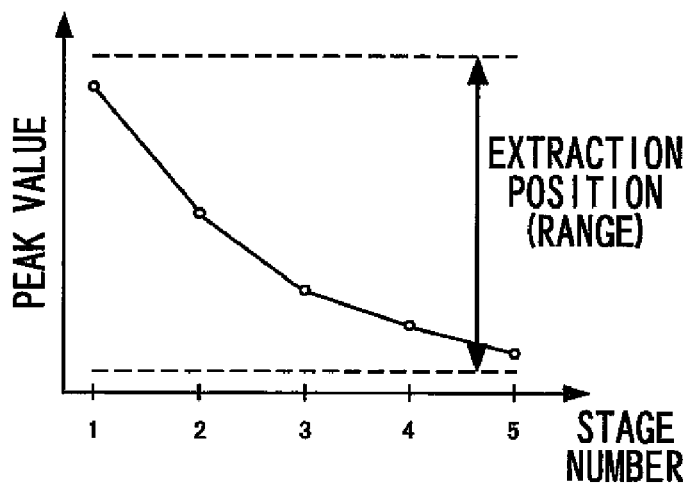
FIG. 4B is a graph showing a range in which data is extracted from computation result data points at each of stages of a conventional fast Fourier transform.

Now, for example, input data which, as shown in FIG. 4A, is sampled from an impulse-type signal is fast Fourier-transformed by the fast Fourier transform circuit 10 and, for example, as in a previous method, the bit extraction section 24 always extracts the most significant 16 bits of data of each 27 bits of computation result data, and sets the 16 bits to serve as input data for the next stage. In such a case, it is known that because the least significant bits are discarded by the bit extraction section 24 at each stage, with each stage advance, a peak value of values indicated by the data extracted from the computation result data shifts, as shown in FIG. 4B.

Figure 4C:
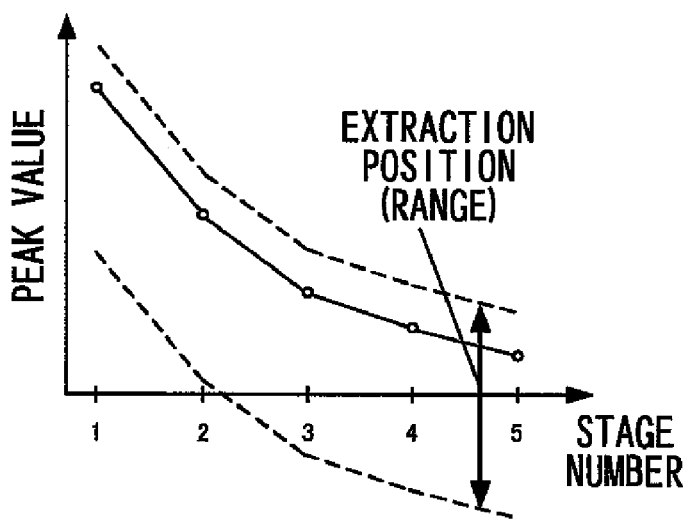
FIG. 4C is a graph showing ranges in which data is extracted from computation result data points at each of stages of a fast Fourier transform relating to the first embodiment of the present invention.

On the other hand, in the case of the bit extraction section 24 relating to the present embodiment, as shown in FIG. 4C, data of a pre-specified range is extracted at each stage in accordance with the signal being modulated and demodulated by the fast Fourier transform. The pre-specified ranges have numbers of bits the same as the number of bits of the input data points and serve as effective ranges for the butterfly computations. Therefore, the numbers of least significant bits that are discarded become smaller, and consequently errors can be made smaller.

Now, as an example, a case will be described in which a fast Fourier transform by the fast Fourier transform circuit 10 relating to the present embodiment is applied to an OFDM signal, which is a system used in terrestrial digital broadcasting.

Figure 5:
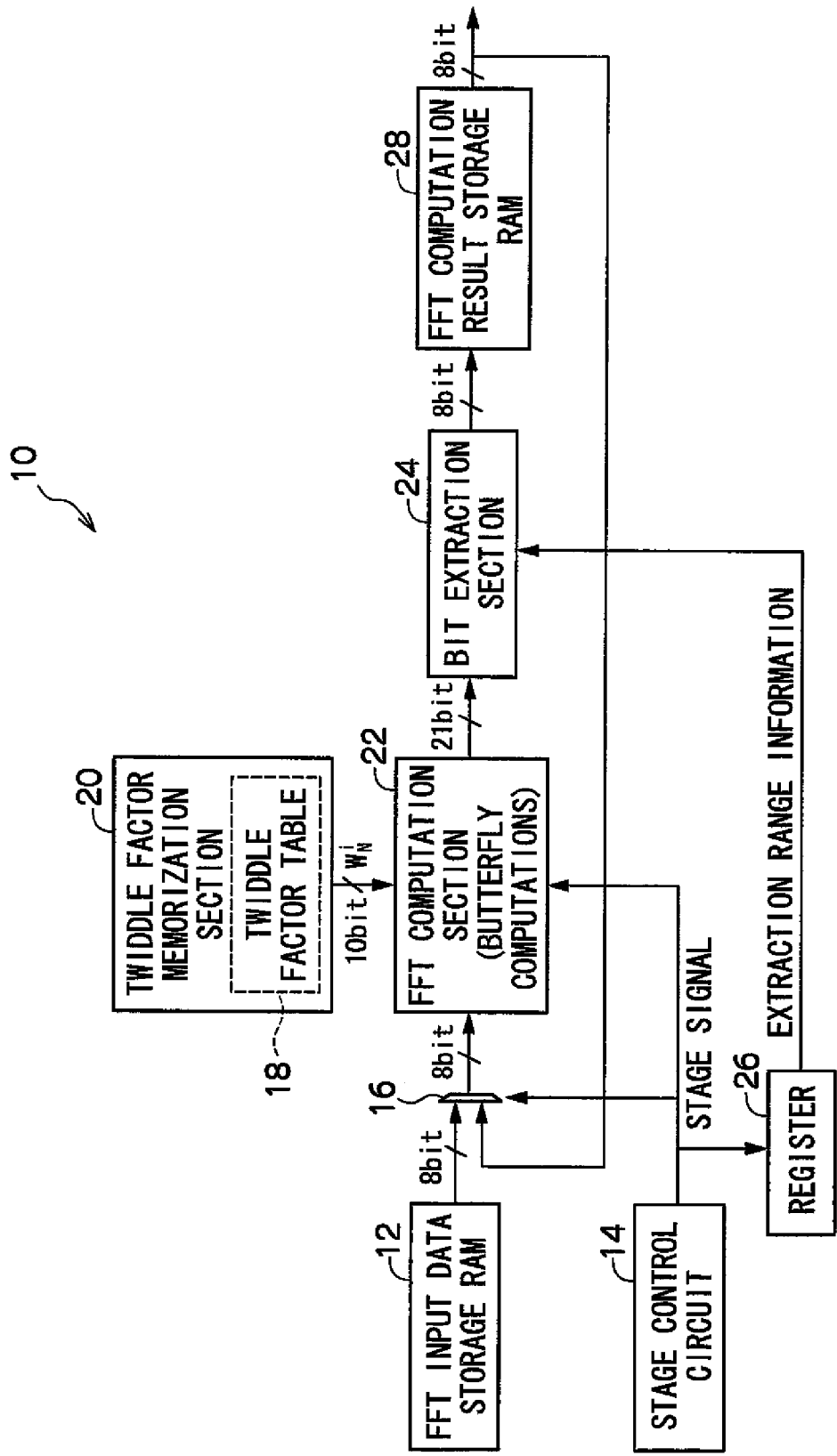
FIG. 5 is a schematic diagram showing structure of a fast Fourier transform circuit in which a bit count of input data and a bit width of an FFT computation result storage RAM are the same.

Herebelow, as shown in FIG. 5, the number of bits of each input data point is 8 bits, and the bit width of the FFT computation result storage RAM 28 is 8 bits. Moreover, a number of data points of the input data is 1,024 and, given that the number of data points is 1,024, the fast Fourier transform circuit 10 provides a fast Fourier transform computation result by repeating radix 4 butterfly computations through 5 stages. Furthermore, the computation result data points outputted from the FFT computation section 22 are at 21 bits, and the bit extraction section 24 extracts 8 bits of data from each 21 bits of computation result data.

The following table 1 shows relative computation errors at this fast Fourier transform circuit 10 for a case in which, as in a previous process, in consideration of overflows with the progress of computations and data extractions, the bit extraction section 24 is fixedly set to always extract 8 bits of data in the range from a 17 bit to a 10th bit, and a case in which, as in the first embodiment, the bit extraction section 24 is set to perform extractions of data in ranges as in table 1 at each stage. Of the numerals in table 1, for example, "17-10" indicates extraction of data from the 17th bit to the 10th bit.

TABLE 1

|  | Stage number | | | | | Relative computation error |
| --- | --- | --- | --- | --- | --- | --- |
|  | 1 | 2 | 3 | 4 | 5 |  |
| Extraction range in previous process | 17-10 | 17-10 | 17-10 | 17-10 | 17-10 | 2.60% |
| Extraction range in first embodiment | 17-10 | 17-10 | 17-10 | 16-9 | 16-9 | 1.74% |

As shown in table 1, with the bit extraction section 24 as in the first embodiment, the relative computation error when optimization of the data extraction range for each stage is implemented is smaller.

As described above, in the fast Fourier transform circuit 10, extraction of data is carried out at the bit extraction section 24 and least significant bits are discarded. Consequently, a value indicated by the extracted data decreases with each stage advance. Accordingly, these relative computation errors indicate proportional errors, relative to a value of an ideal computation result of a fast Fourier transform, of values obtained as results of multiplications in which respective values corresponding to the numbers of bits discarded when data is extracted by the bit extraction section 24 are multiplied with output data which has been fast Fourier-transformed by the fast Fourier transform circuit 10, using the previous process and the process of the present embodiment. Thus, if a value obtained as a multiplied result matched the value of the ideal computation result of the fast Fourier transform, the relative computation error would be 0%.

Thus, if the input data is a terrestrial digital broadcast and numbers of bits of the input data points and the output data points are 8 bits, the relative computation error can be made smaller by shifting the fixed data extraction range toward the lower bits as the stages advance. Note that relationships between the data extraction ranges and the stages will differ from the ranges shown in table 1 in accordance with numbers of bits of input data points and output data points, characteristics of the input data and the like.

As described above, according to the present embodiment, butterfly computations are applied to input data at each stage. From the computation result data points that are computed, at each step, data in a range with the same number of bits as the number of bits of the input data and which is effective for the butterfly computations is extracted, and the extracted data is set to serve as input data when butterfly computations are to be performed in the next step. Thus, a relative computation error at each stage can be made smaller. Therefore, a relative computation error of final computation results of the fast Fourier transform can be made smaller.

Moreover, according to the fast Fourier transform circuit 10 relating to the present embodiment, because relative computation errors can be reduced by altering the range of data extraction after the butterfly computations for each stage, in comparison with a floating point-type fast Fourier transform computation circuit, a fast Fourier transform can be implemented with a very simple circuit structure, and an effect of a reduction in power consumption can be expected.

Second Embodiment

Now, with the fast Fourier transform circuit 10 relating to the above-described first embodiment, if characteristics of the signal to which the fast Fourier transform is to be applied are not previously known, it will be difficult to optimize the data extraction range for each stage. In particular, in a case in which input data is sampled from an impulse signal, a peak value will vary greatly. Consequently, optimization of the data extraction ranges will not be possible if the characteristics of the signal cannot be ascertained in advance, and the computation error will increase.

Accordingly, a variant example will be described in which input data to be subjected to butterfly computations by the FFT computation section 22 is analyzed, and a range of data to be extracted by the bit extraction section 24 is fixed in accordance with the input data.

Figure 6:
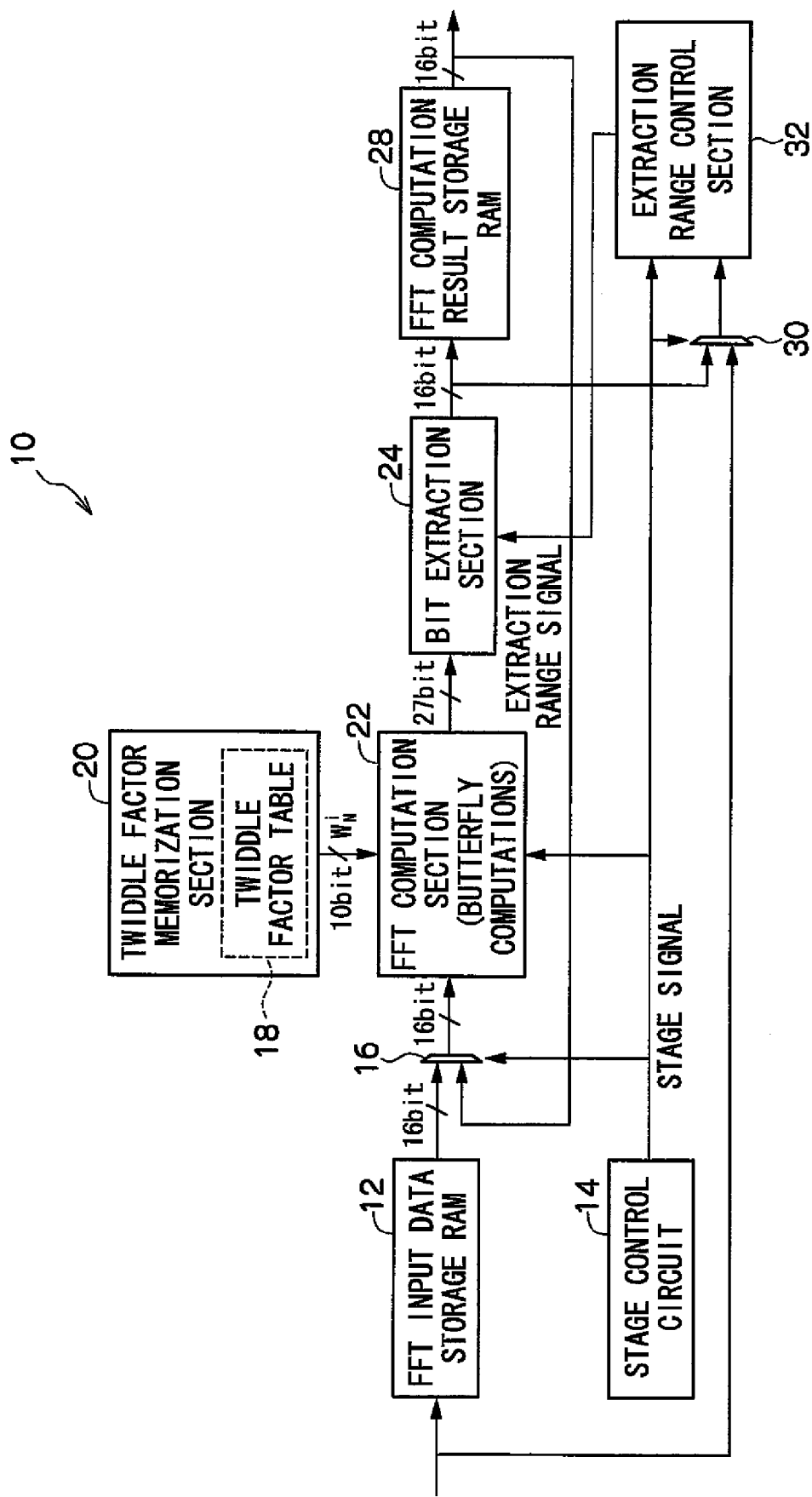
FIG. 6 is a schematic diagram showing structure of a fast Fourier transform circuit relating to a second embodiment of the present invention.

FIG. 6 shows structure of the fast Fourier transform circuit 10 relating to the second embodiment. Structural elements that are the same in FIG. 6 as in FIG. 1 are assigned the same reference numerals as in FIG. 1, and descriptions thereof will not be given.

As shown in FIG. 6, the fast Fourier transform circuit 10 is provided with a selector 30 and an extraction range control section 32. The selector 30 selectively outputs input data that is inputted to be a subject to which a fast Fourier transform is applied or data that has been extracted by the bit extraction section 24. The extraction range control section 32 analyzes the data inputted by the selector 30, estimates what kind of characteristics a signal has from results of the analysis, and controls the range of data to be extracted from computation result data points.

Figure 7:
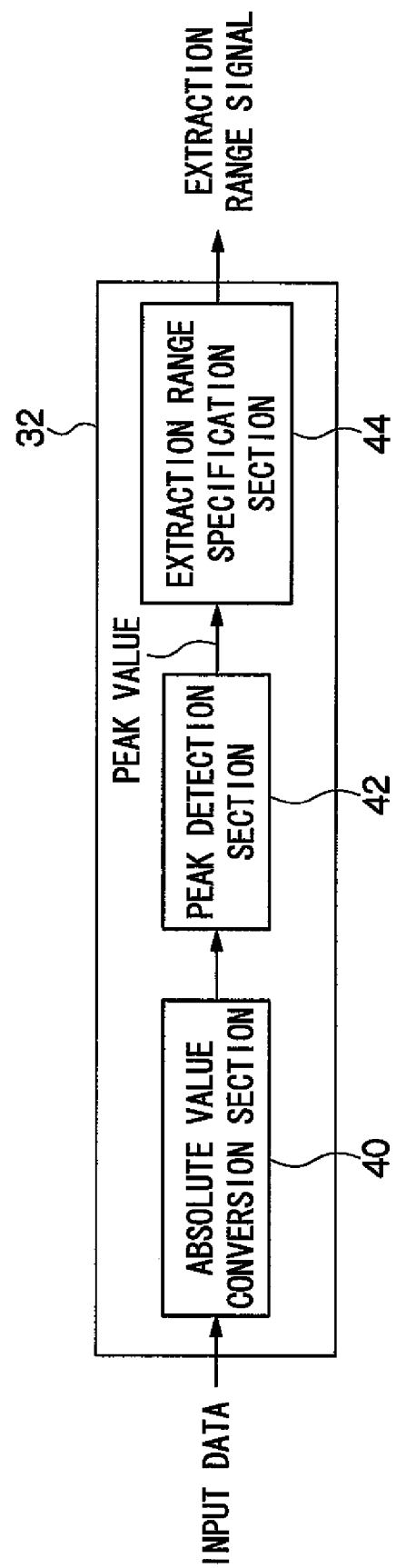
FIG. 7 is a schematic diagram showing detailed structure of an extraction range control section relating to the second embodiment of the present invention.

FIG. 7 shows detailed structure of the extraction range control section 32 relating to the second embodiment.

As shown in FIG. 7, the extraction range control section 32 is provided with an absolute value conversion section 40, a peak detection section 42 and an extraction range specification section 44. The absolute value conversion section 40 converts values represented by data into absolute values. The peak detection section 42 detects a peak value (a maximum value) among the data which has been converted to absolute values. The extraction range specification section 44, on the basis of data that constitute the peak value detected by the peak detection section 42, specifies the range of data to be extracted from computation result data points by the bit extraction section 24, and outputs extraction range information representing the specified range.

At the extraction range specification section 44, an extraction range table in which extraction ranges correspond one-to-one with margin bit counts at the MSB (most significant bit) side of data is memorized in advance. The extraction range specification section 44 finds, in the data of a peak value detected by the peak detection section 42, at what position in the data there is a '1' at the MSB side and detects how many bits there are in a margin to the MSB side. The extraction range specification section 44 extracts information corresponding to the most significant side margin bit count from the extraction range table, and outputs this information to serve as the extraction range information.

Next, operation of the fast Fourier transform circuit 10 relating to the present embodiment will be described. Herein, the fast Fourier transform circuit 10 relating to the present embodiment performs a fast Fourier transform of input data with a data point count of 512, and bit counts of input data points are 27.

When the stage signal inputted by the stage control circuit 14 indicates the first stage, the selector 30 selects the input data inputted to serve as the subject to which the fast Fourier transform is to be applied, and outputs the input data to the extraction range control section 32. If the stage signal indicates the second or a subsequent stage, the selector 30 selects data which has been extracted by the bit extraction section 24 and outputs this data to the extraction range control section 32. In all cases other than the final stage, the data extracted by the bit extraction section 24 is data to be set as input data for the next stage.

That is, the extraction range control section 32 carries out specification of a data extraction range on the basis of input data which has been subjected to butterfly computations by the FET computation section 22.

FIG. 8A to FIG. 8E show a flow when a data extraction range is being specified by the extraction range control section 32.

Figure 8A:
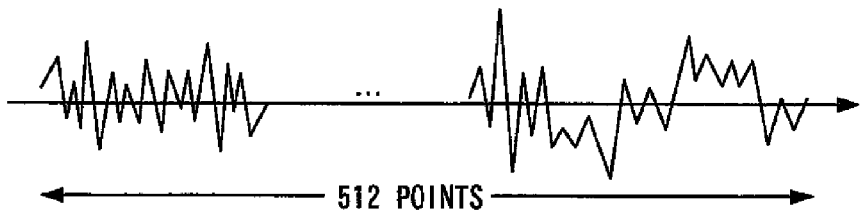
Figure 8B:

The absolute value conversion section 40 transforms, for example, values represented by the data shown in FIG. 8A to absolute values as shown in FIG. 8B.

Figure 8C:
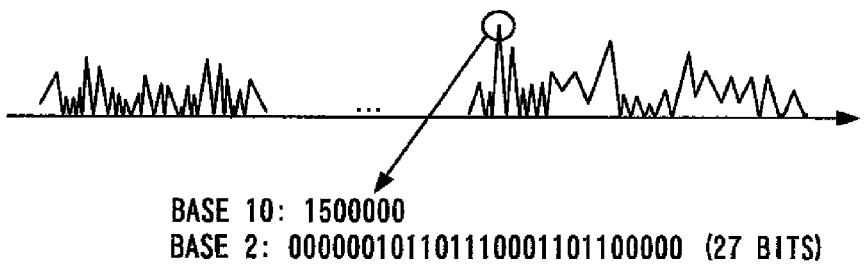

The peak detection section 42 detects a peak value (maximum value) from among the values that have been converted to absolute values, as shown in FIG. 8C.

Figure 8D:
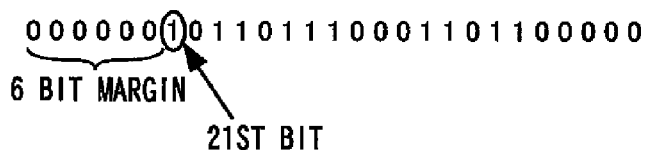
Figure 9:
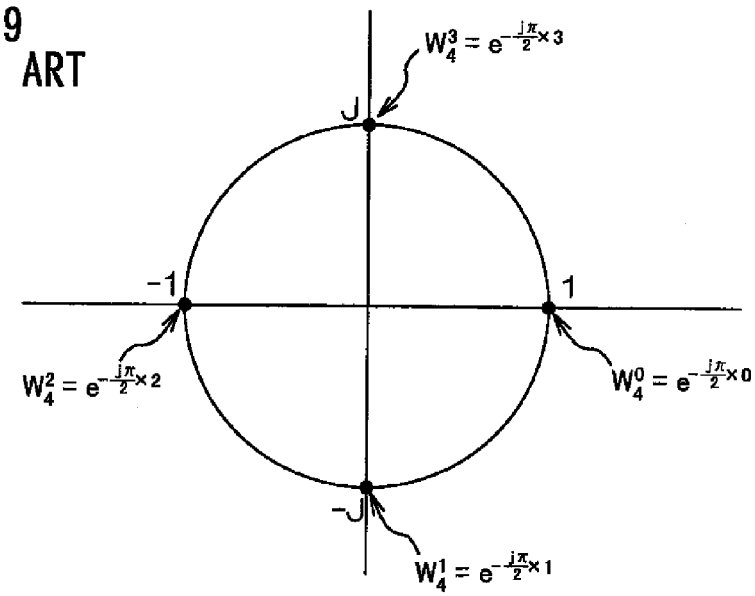
FIG. 9 is a diagram showing a twiddle factor in a complex plane.
Figure 10:
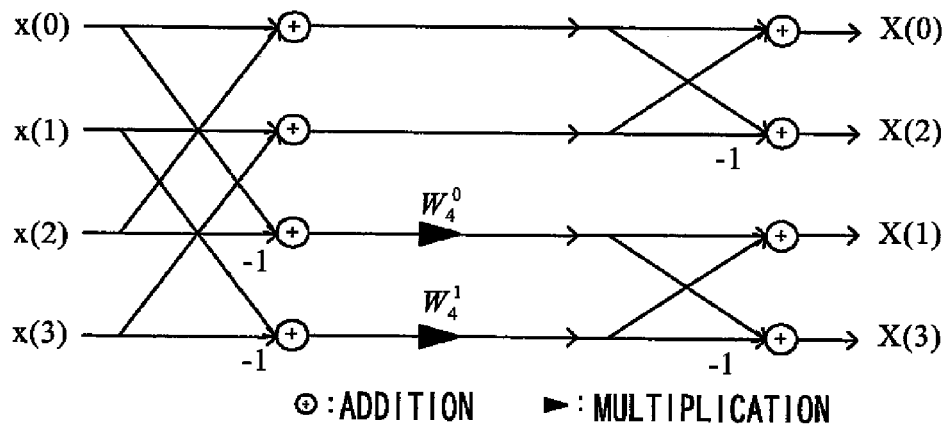
FIG. 10 is a diagram showing a flow of computation of a fast Fourier transform with a number of data points being 4.
Figure 11:
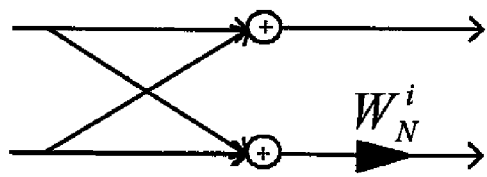
FIG. 11 is a diagram showing flow of a butterfly computation.
Figure 12:
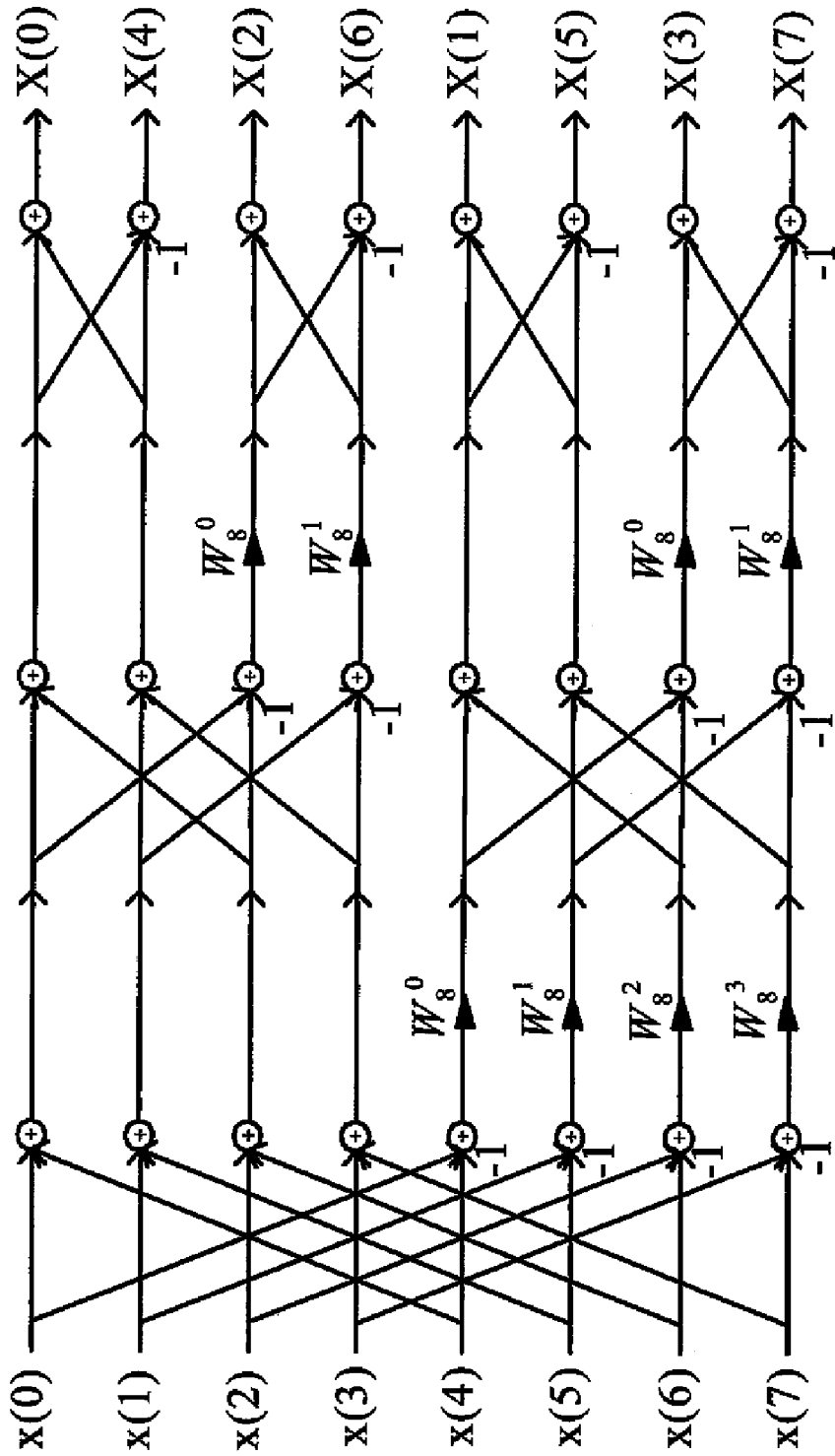
FIG. 12 is a diagram showing a flow of computations of a fast Fourier transform with a number of data points being 8.
Figure 13:
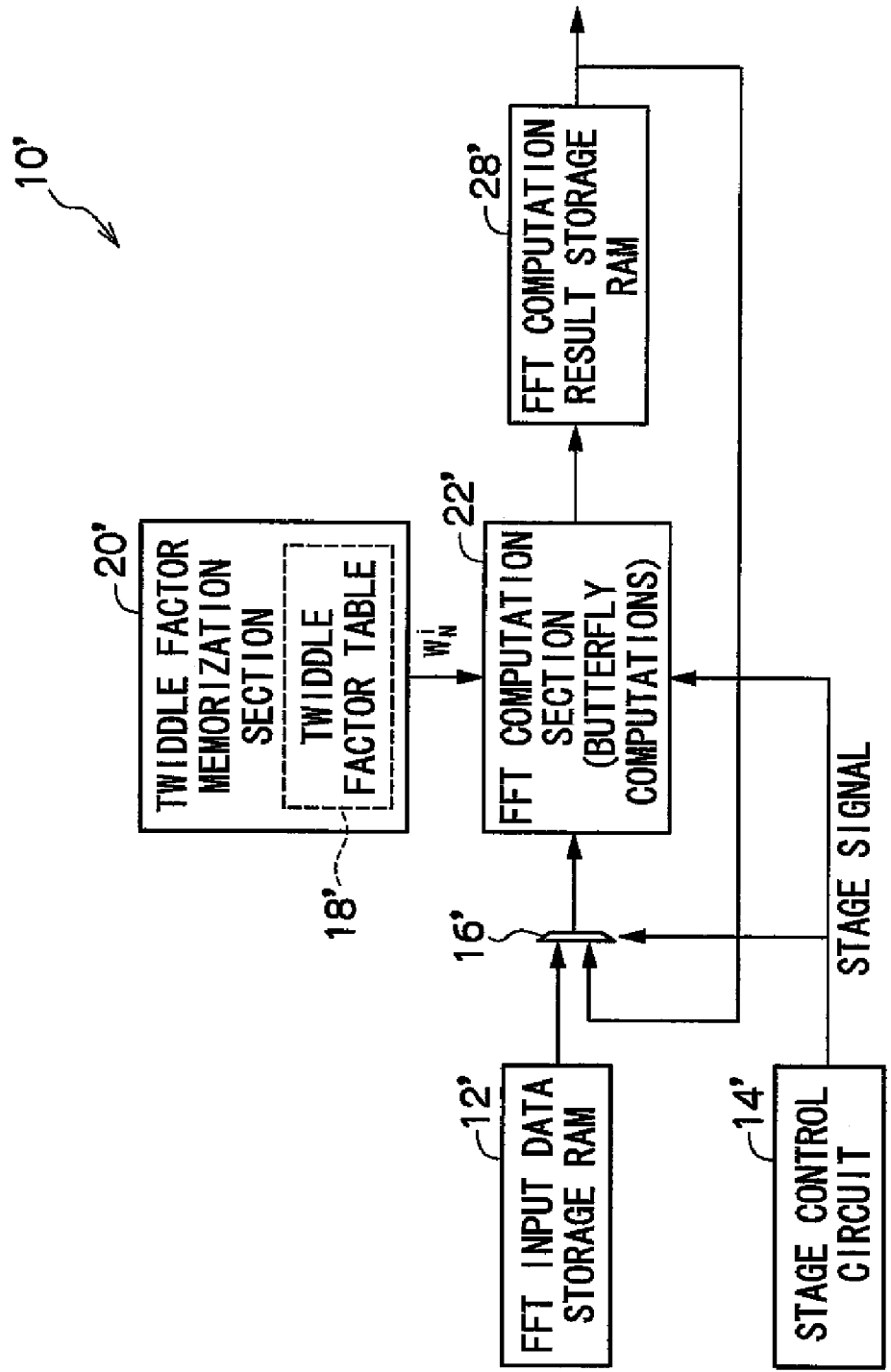
FIG. 13 is a schematic diagram showing structure of a previous fast Fourier transform circuit.
Figure 14:
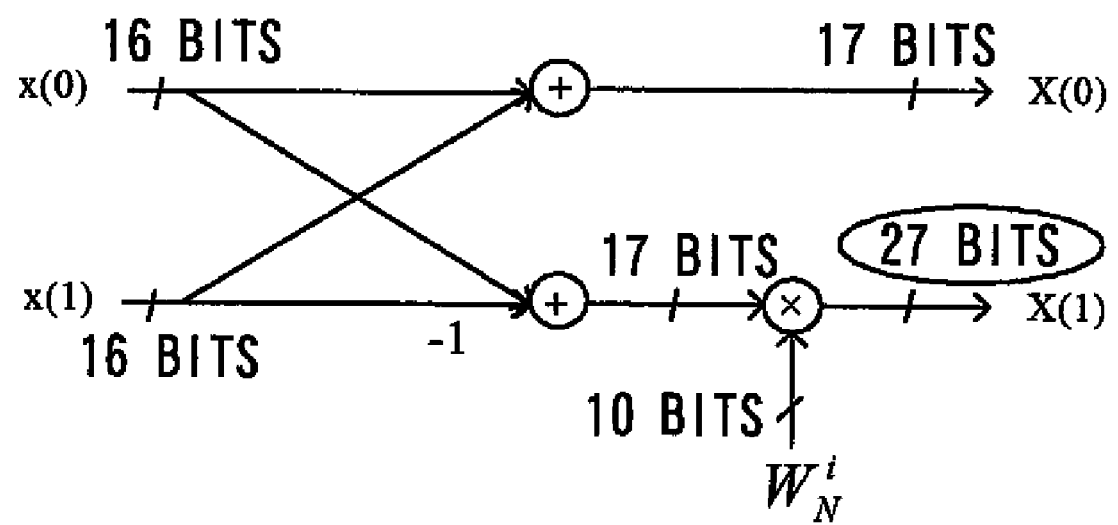
FIG. 14 is a diagram showing changes in bit numbers through a butterfly computation.
Figure 15:
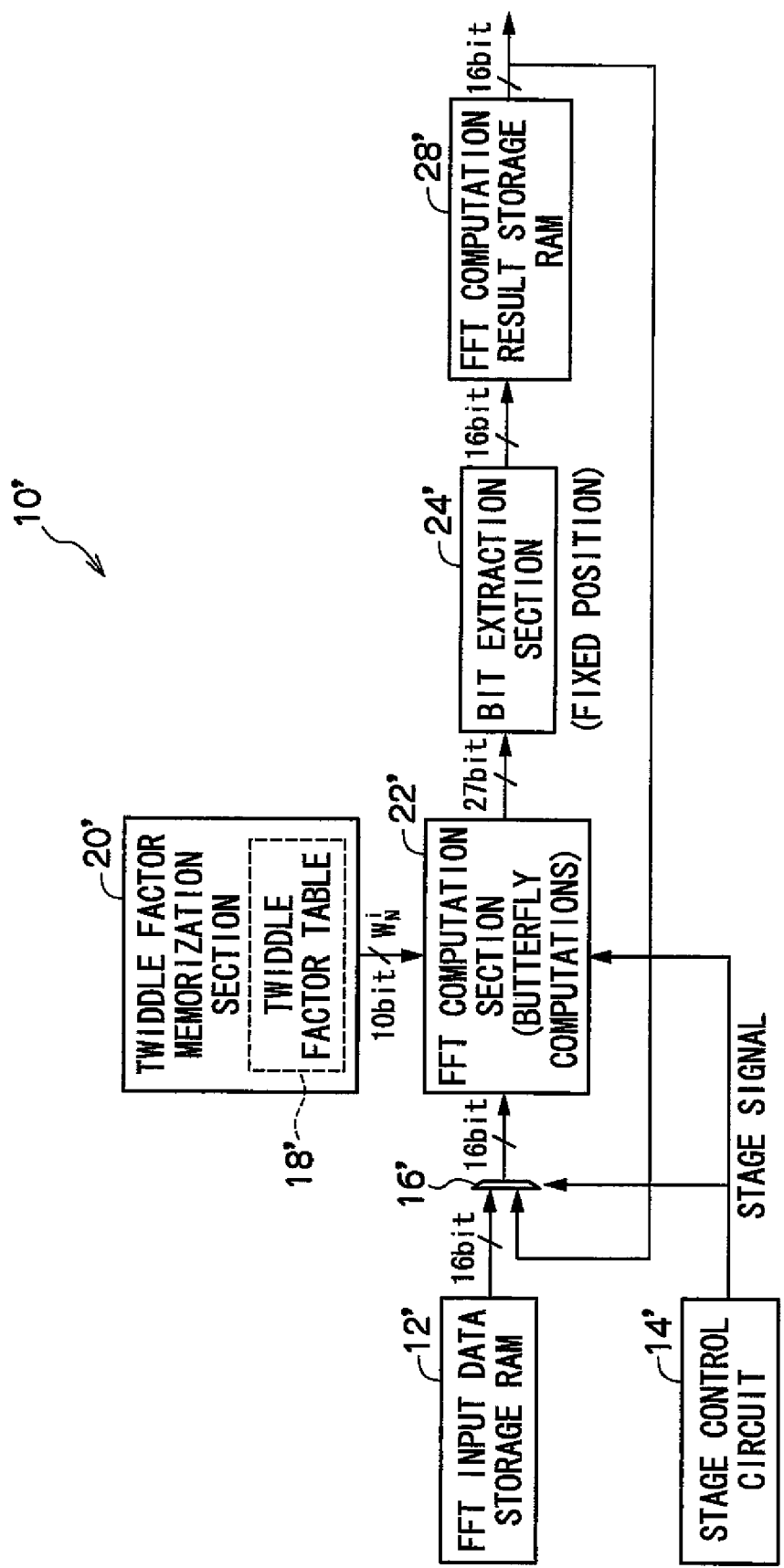
FIG. 15 is a schematic diagram showing structure of a previous fast Fourier transform circuit.

The extraction range specification section 44 finds at what position in the 27 bits of the detected peak value there is a '1' closest to the MSB side, and detects how many bits there are in a margin at the MSB side, as shown in FIG. 8D. Then, as shown in FIG. 8E, the extraction range specification section 44 extracts information corresponding to the upper side margin bit count from the extraction information table, and outputs this information as extraction range information.

For example, if the peak value is 1,500,000 base 10 as shown in FIG. 8C, the extraction range specification section 44 specifies a data extraction range of a total of 16 bits, from the 22nd bit to the 7th bit of the 27 bits.

As described above, according to the present embodiment, input data is analyzed when butterfly computations are to be carried out at each stage by the FFT computation section 22, and a range of data extraction from computation result data points from the butterfly computations is controlled in accordance with characteristics of the input data. Hence, relative computation errors at each stage of the fast Fourier transform can be made smaller. Therefore, a relative computation error of final computation results of the fast Fourier transform can be made smaller.

Furthermore, according to the fast Fourier transform circuit 10 relating to the present embodiment, similarly to the first embodiment, a fast Fourier transform can be implemented with a simpler circuit structure than a floating point-type fast Fourier transform computation circuit, and an effect of a reduction in power consumption can be expected.

Anyway, for the first and second embodiments, using RAM for the FFT input data storage RAM 12 and the FFT computation result storage RAM 28 has been described. However, the present invention is not limited thus. For example, any memory, register or the like featuring functions which enable storage/retention of data can be used. In such a case, the same effects as with the present embodiments can be realized.

Further, for the first embodiment, a case has been described of extraction range information representing a range of data to be extracted being provided from the register 26 to the bit extraction section 24. However, the present invention is not limited thus. As long as the data extraction range at the bit extraction section 24 can be altered from thereoutside, the extraction range information can be received from anywhere. Moreover, it is possible to memorize data extraction ranges for each stage at the bit extraction section 24. In such cases, the same effects as with the present embodiment can be realized.

Further, for the first embodiment, a case of a fast Fourier transform with a number of data points being 8 has been described as an example. However, the present invention is not limited thus. As long as the number of data points is $2^n$ (n being a natural number greater than 0), any number is applicable.

Further, for the first and second embodiments, a fast Fourier transform computation process in which a discrete-time Fourier transform is decomposed with a radix being 2 has been described. However, extraction of data by the bit extraction section 24 is not limited in radix, and moreover, is applicable to a case of decomposition of a discrete-time Fourier transform which implements a combination of a plurality of radixes.

Furthermore, for the second embodiment, a case has been described of specifying the data extraction range using the extraction range table of FIG. 8E. However, the present invention is not limited thus. For example, the data extraction range may be calculated with a calculation equation for which the margin bit count is an input value, or suchlike.

Additionally, the structures of the fast Fourier transform circuit 10 described for the first and second embodiments (see FIG. 1, FIG. 2A to FIG. 2D, FIG. 5 and FIG. 6) and the structure of the extraction range control section 32 (see FIG. 7) are examples, and can be suitably modified within a scope not departing from the spirit of the present invention.

Further, the flow of the fast Fourier transform control processing described for the first embodiment (see FIG. 3) is an example, and can be suitably modified within a scope not departing from the spirit of the present invention.

Further, the table structure of the extraction range table described for the second embodiment (see FIG. 8E) is an example, and can be suitably modified within a scope not departing from the spirit of the present invention.

In order to achieve the object described earlier, a first aspect of the present invention includes: a circuit including a data storage element; a circuit computation component that performs a discrete-time Fourier transform computation on data from the data storage element by dividing computations between a plurality of steps, the computations performing butterfly computations on $2^n$ points of input data each of a predetermined number of bits, n being a natural number greater than 0, and calculating $2^n$ computation result data points with numbers of bits larger than the predetermined number of bits; an extraction component that, at each step, extracts, from the computation result data points calculated by the computation component, data in a pre-specified range with a number of bits the same as the predetermined number of bits, which is an effective range for the butterfly computations; a setting component that sets the data points of the predetermined number of bits which have been extracted by the extraction component to serve as input data when butterfly computations of a next step are to be performed by the computation component; an electrical output for electrically outputting the resulting data from the fast Fourier transform circuit.

In the first aspect of the present invention, the computation component performs a discrete-time Fourier transform computation on $2^n$ (n being a natural number greater than 0) input data points which each have the predetermined number of bits. The computations are carried out having been divided into the plural stages. The computations calculate $2^n$ computation result data points with numbers of bits greater than the predetermined number of bits. The extraction component extracts, from each computation result data point calculated by the computation component, data in a range, specified in advance for the respective stage, with a number of bits the same as the predetermined number of bits, which is a range effective for butterfly computations. The setting component sets the data points with the predetermined number of bits which have been extracted by the extraction component to serve as input data when butterfly computations are to be performed by the computation component in a next step.

According to the first aspect, butterfly computations in accordance with each step are applied to the $2^n$ input data points with the predetermined number of bits, data in pre-specified ranges, which have bit counts the same as the predetermined number of bits and are effective ranges for butterfly computations, are extracted from the respective computation result data points which have been calculated, and the data points with the predetermined number of bits that have been extracted are set to serve as input data when butterfly computations of the next step are being performed. Thus, computation errors can be made smaller.

In a second aspect of the present invention, the effective range of the first aspect is specified in accordance with a position of a bit that is a '1' closest to a most significant side of the input data to which butterfly computation is applied by the computation component.

A third aspect of the present invention: extracts data from computation result data when a discrete-time Fourier transform computation is being performed by division of computations between a plurality of steps, the computations performing butterfly computations on $2^n$ points of input data each of a predetermined number of bits, n being a natural number greater than 0, and calculating $2^n$ computation result data points with numbers of bits larger than the predetermined number of bits, including extracting, at each step, from the computation result data points that have been calculated, data in a pre-specified range with a number of bits the same as the predetermined number of bits, which is an effective range for the butterfly computations; and sets the data points of the predetermined number of bits which have been extracted to serve as input data when butterfly computations of a next step are to be performed.

The third aspect operates in a similar manner to the first aspect. Thus, similarly to the first aspect, computation errors can be made smaller.

In a fourth aspect of the present invention, the effective range of the third aspect is specified in accordance with a position of a bit that is a '1' closest to a most significant side of the input data to which butterfly computation is applied.

A fifth aspect of the present invention includes: performing a butterfly computation on inputted data and outputting a butterfly computation result of m bits, m being a natural number of at least 2; extracting a predetermined n bits of the m bit butterfly computation result, n being a natural number smaller than m and larger than 0; and performing a butterfly computation using the extracted n bits of the butterfly computation result.

As described above, according to the present invention, butterfly computations in accordance with each of steps are applied to $2^n$ input data points with a predetermined number of bits, data with pre-specified ranges with bit counts the same as the predetermined number of bits, which are ranges effective for butterfly computations, are extracted from the respective computation result data points which have been calculated, and the data points with the predetermined number of bits that have been extracted are set to serve as input data when butterfly computations of a next step are to be performed. Thus, an excellent effect is provided in that computation errors can be made smaller.

What is claimed is:

1. A fast Fourier transform circuit comprising:
a circuit including a data storage element;
a circuit computation component that performs a discrete-time Fourier transform computation on data from the data storage element by dividing computations between a plurality of steps, the computations performing butterfly computations on $2^n$ points of input data each of a predetermined number of bits n, n being a natural number greater than 0, and calculating $2^n$ computation result data points with numbers of bits larger than the predetermined number of bits n;
an extraction component that, at each step, extracts, from the computation result data points calculated by the computation component, data in a pre-specified range with a number of bits the same as the predetermined number of bits n, which is an effective range for the butterfly computations;
a setting component that sets the data points of the predetermined number of bits n which have been extracted by the extraction component to serve as input data when butterfly computations of a next step are to be performed by the computation component; and
an electrical output for electrically outputting the extracted data in the pre-specified range from the fast Fourier transform circuit.

2. The fast Fourier transform circuit of claim 1, wherein the effective range is specified in accordance with a position of a bit that is a '1' closest to a most significant side of the input data to which butterfly computation is applied by the computation component.

3. The fast Fourier transform circuit of claim 2, further comprising an extraction range table that associates positions of the bit that is a '1' closest to the most significant side with effective ranges,
wherein the effective range is determined by reference to the extraction range table.

4. The fast Fourier transform circuit of claim 1 wherein, in a case in which the input data is data of a terrestrial digital broadcast, the computation component shifts the effective range toward a least significant bit with progress of the steps.

5. A fast Fourier transform method comprising:
electrically inputting data to a data storage element of a fast Fourier transform circuit;
electrically outputting data from the data storage element to a fast Fourier transform element within the fast Fourier transform circuit;
extracting data from computation result data when a discrete-time Fourier transform computation is being performed by the fast Fourier transform element by division of computations between a plurality of steps, the computations performing butterfly computations on $2^n$ points of input data each of a predetermined number of bits n, n being a natural number greater than 0, and calculating $2^n$ computation result data points with numbers of bits larger than the predetermined number of bits n,
including extracting, at each step, from the computation result data points that have been calculated, data in a pre-specified range with a number of bits the same as the predetermined number of bits n, which is an effective range for the butterfly computations;
setting the data points of the predetermined number of bits n which have been extracted to serve as input data when butterfly computations of a next step are to be performed; and
electrically outputting the extracted data in the pre-specified range from the fast Fourier transform circuit.

6. The fast Fourier transform method of claim 5, wherein the effective range is specified in accordance with a position of a bit that is a '1' closest to a most significant side of the input data to which butterfly computation is applied.

7. The fast Fourier transform method of claim 6, wherein the effective range is determined by reference to an extraction range table,
the extraction range table associating positions of the bit that is a '1' closest to the most significant side with effective ranges.

8. The fast Fourier transform method of claim 5 wherein, in a case in which the input data is data of a terrestrial digital broadcast, the effective range shifts toward a least significant bit with progress of the steps.

9. A fast Fourier transform method comprising:
electrically inputting data to a data storage element of a fast Fourier transform circuit;
electrically outputting data from the data storage element to a fast Fourier transform element within the fast Fourier transform circuit;
performing a butterfly computation on data output from the data storage element and outputting a butterfly computation result of m bits, m being a natural number of at least 2;
extracting a predetermined n bits of the m bit butterfly computation result, n being a natural number smaller than m and larger than 0;
performing a butterfly computation using the extracted predetermined n bits of the butterfly computation result; and
electrically outputting the extracted predetermined n bits of the butterfly computation result from the fast Fourier transform circuit.

10. The fast Fourier transform method of claim 9, wherein a position of the predetermined n bits is specified in accordance with a position of a bit that is a '1' closest to a most significant side of the inputted data.

11. The fast Fourier transform method of claim 10, wherein the predetermined n bits is determined by reference to an extraction range table,
the extraction range table associating positions of the bit that is a '1' closest to the most significant side with effective ranges.

* * * * *